Patented Aug. 28, 1934

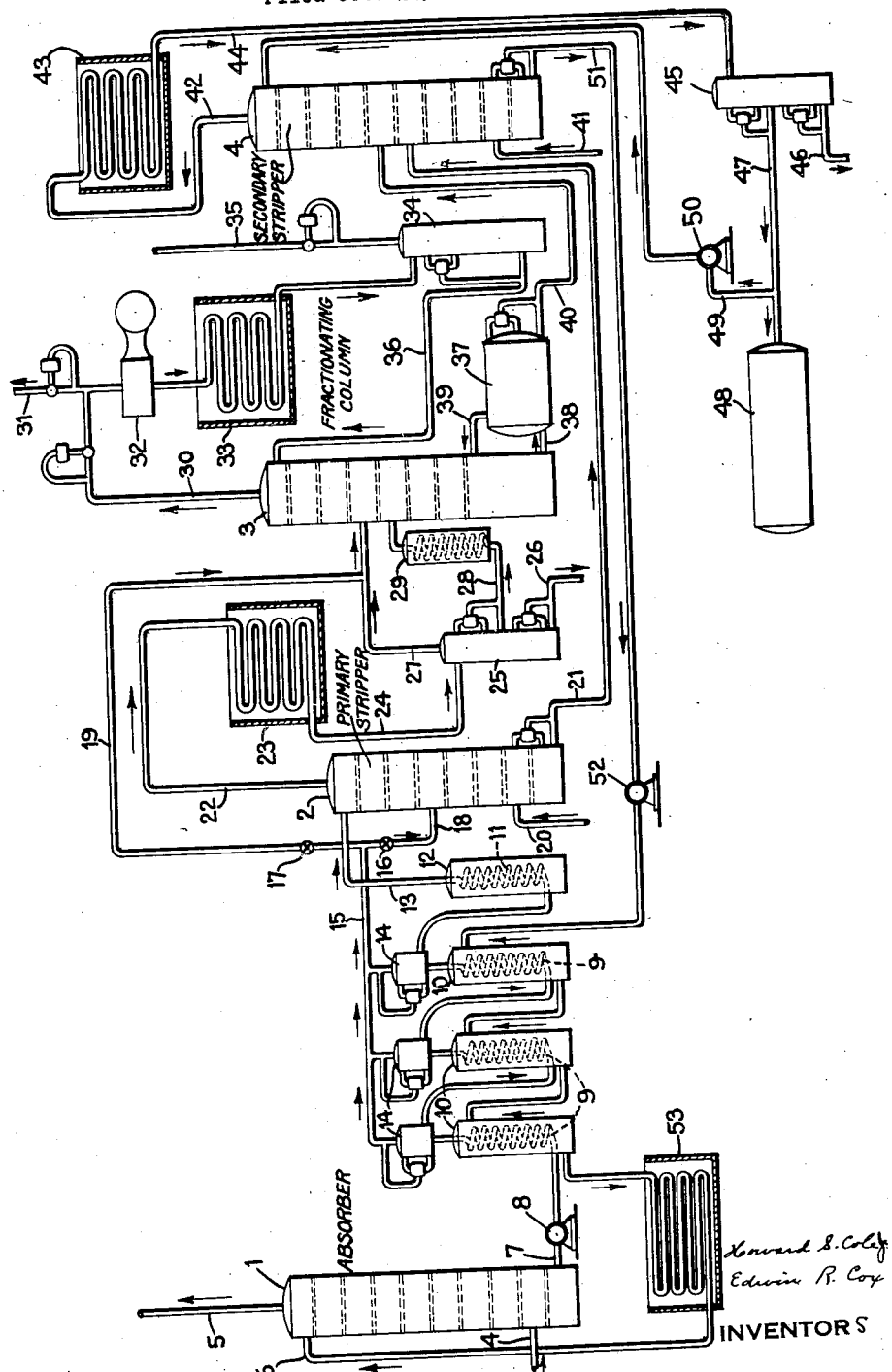

1,972,060

UNITED STATES PATENT OFFICE 1,972,060

RECOVERY OF GASOLINE FROM NATURAL GAS

Howard S. Cole, Jr., Pasadena, and Edwin R. Cox, Los Angeles, Calif., assignors to The Texas Company, New York, N. Y., a corporation of Delaware Application October 24, 1930, Serial No. 490,849

8 Claims. (Cl. 196—8)

This invention relates to the recovery of gasoline from natural gas by absorption in a liquid absorbent and has to do particularly with a process and apparatus for the removal of undesirable light combustible hydrocarbons from the absorbent liquid prior to the final distillation of the gasoline therefrom.

The usual method of recovering gasoline from natural gas is to absorb from the wet gas all of the natural gasoline and a substantial amount of light combustible hydrocarbons, in order that none of the gasoline fractions are lost in the dry gas. All of the absorbed products are then distilled, usually in one operation, from the absorbent oil. As a result, a considerable quantity of gases are evolved and vented from the stripper during the distillation. These gases often contain as much as 25 to 30 percent of gasoline and are usually recompressed to recover the gasoline content. The gasoline condensate recovered from the stripper, even though a considerable amount of gases and light vapors are vented from the stripper, contains a substantial amount of light hydrocarbons that must be removed before a stable gasoline is obtained. The removal of the gasoline is ordinarily done in a stabilizer or fractionating process which involves substantially a redistillation of the condensate. It will be observed, therefore, that the production of a stable gasoline by prior methods has been somewhat complex, principally because large quantities of undesirable constituents more volatile than the desired gasoline fraction have been circulated through the system.

The present invention comprises a process and apparatus whereby the light combustible hydrocarbons are removed from the rich absorbent oil in the early stages of the process without the loss of gasoline components, and then a stable gasoline recovered from the absorbent oil. More particularly, according to the invention, the gasoline and a substantial amount of light combustible hydrocarbons are absorbed in a liquid absorption medium and then the absorbed components removed in successive stripping operations. In the primary stripping operation the light ends of the gasoline and light combustible hydrocarbons are distilled from the rich absorbent oil. Relatively little steam is required in this operation, since only a small portion of the gasoline is vaporized at this stage. The vapors are then cooled sufficiently to separate the steam and condense a substantial amount of the higher boiling constituents and the condensate, free from condensed steam, is then introduced into a fractionating column along with the uncondensed vapors from the stripper. A sharp separation is made in the fractionating column between the light ends of the gasoline and the light combustible hydrocarbons. In order to do this, the vapors from the top of the fractionating column are preferably recompressed to produce a distillate and this distillate is then returned to the top of the fractionating column to be used as a reflux and also for cooling purposes. The liquids in the fractionating column are preferably reboiled to insure complete elimination of constituents lighter than gasoline and the gasoline components from the reboiling operation then combined with the distillate from the secondary stripping operation to produce a stable gasoline.

The advantage of the process of the invention is a substantial saving in steam, cooling water and power required to operate the processes. A saving in steam is realized in the stripping operations by evaporating only a small portion of the gasoline in the primary stripper wherein the highest pressure is maintained and then stripping the remainder of the gasoline from the absorbent oil in the secondary stripper wherein the distillation may be carried out under a substantially reduced pressure with a conservative amount of steam. There is a saving in cooling water in that a higher condensing temperature may be maintained than in prior methods wherein the vapors are highly diluted with light gases. A saving in power is obtained by recompressing a smaller volume of vapors and through a much smaller range of pressures. Other advantages of the invention will be apparent as the process and apparatus are described.

The accompanying drawing illustrates an elevation of an apparatus partly in section, suitable for carrying out the process.

Referring to the drawing, the absorption system comprises an absorber 1, a primary stripper 2, a fractionating column 3, and a secondary stripper 4. The absorber may be of any suitable type and is equipped with an inlet 4 for rich gas, an outlet 5 for dry gas and an inlet 6 for introducing the absorbent medium to the top of the column. The rich absorbent liquid is drawn from the bottom of the column through the pipe 7 and forced by the pump 8 through a series of coils 9 in the heat exchangers 10. From the heat exchangers the oil passes through a coil 11, in preheater 12, and finally through the line 13 into the top of primary stripper 2. A series of vapor vents 14 are positioned at the outlets at each of the coils 9 to vent off vapors generated as the rich oil is gradually heated. The light vapors released in the vents 14 enter the vapor line 15 and by suitable regulation of valves 16 and 17, may pass either to the primary stripper 2 or the fractionating column 3 through the lines 18 and 19 respectively.

Primary stripper 2 may be provided with steam through the line 20 to aid in stripping the rich oil therein. The partially denuded absorbent oil is drawn from the bottom of the stripper through the line 21 and delivered to the secondary stripper 4. The vapors from the primary stripper are conducted through the line 22 to a cooler 23, and the liquids condensed therein drained through line 24 to receiver 25. Water settled out in the receiver 25 may be withdrawn thrown the line 26. Uncondensed vapors are passed from the receiver 25 through the line 27 to the fractionating column. Light condensate collecting in receiver 25 is withdrawn through the line 28, passed through a preheater 29, preferably of the steam type, and the heated oil then introduced into the fractionating column 3.

Vapors from the fractionating column 3 pass up the line 30 and may be vented, if desired, through the line 31. However, these vapors are preferably compressed by compressor 32, cooled in cooler 33, and the condensate collected in receiver 34. Uncondensed vapors and gases from receiver 34 may be vented through the line 35. The condensate collecting in receiver 34 is passed through line 36 to the top of fractionating column 3 as a reflux medium and also for cooling the column. Liquids collecting at the bottom of the fractionating column are reboiled in the reboiler 37 to insure a sharp cut between the light ends of the gasoline and the light combustible hydrocarbons. The liquid from the column passes through line 38 to the reboiler and the vapors from the reboiler are returned to the fractionating column through line 39. The reboiler 37 may be suitably heated, preferably by a steam coil. The unvaporized liquids from the reboiler are passed through the line 40 to the secondary stripper 4 where they commingle with the heavier fractions of the gasoline vaporized in this stripper.

Steam is preferably introduced into the secondary stripper 4 to aid the distillation. This may be done by means of pipe 41. Vapors from the top of the stripper are led through the vapor pipe 42 to the condenser 43. The condensate from the condenser drains through line 44 to the receiver 45. Water separating out in the receiver may be drained through pipe 46 and the gasoline condensate delivered by pipe 47 to the run-down tank 48. A part of the condensate passing through line 47 may be diverted through line 49 and forced by the pump 50 to the top of the secondary stripper to act as a reflux medium. The lean absorbent oil collecting in the bottom of the secondary stripper is drawn therefrom through line 51 and forced by the pump 52 through the heat exchangers 10 in heat exchange with the rich absorbent oil from the absorber. The partially cooled lean absorbent oil from the exchangers 10 is further cooled in cooler 53 before passing through line 6 back to the top of the absorber.

In practicing the process with the apparatus illustrated in the drawing, a wet gas containing a substantial amount of gasoline is introduced at the bottom of the absorber through the line 4. The gas passes up through the absorber countercurrent to the absorbent oil introduced through the pipe 6. In the absorber all the gasoline and a substantial amount of lighter combustible hydrocarbons are absorbed in the absorbent oil to insure no loss of gasoline constituents in the dry gas. The dry gas passing out of the system through the line 5, preferably contains only constituents lighter than butane. The rich absorbent oil is gradually heated in the heat exchangers 10 and then preheater 12 to a temperature in the neighborhood of 350° F. prior to the entrance of the oil to the primary stripper. During the gradual heating of the rich oil in the exchangers, a considerable amount of vapors are generated and preferably released through the vents 14. The vapors, depending on their nature, may pass either to the fractionating column or to the primary stripper. In case the vapors are substantially all light combustible hydrocarbons and substantially no gasoline, they are passed to the fractionating column. However, if these vapors contain large quantities of heavier gasoline fractions, they are preferably passed to the primary stripping chamber.

The stripping chamber 2 is maintained under a pressure from 75 to 150 lbs. per sq. in., preferably 110 lbs. per sq. in. A small amount of steam is usually introduced through the pipe 20 to vaporize the light combustible hydrocarbons and a small fraction of the gasoline from the absorbent oil. The vapors are led to the cooler 23 where they are cooled to the temperature of about 80° F. to insure condensation of all the steam. Water is allowed to settle out in receiver 25 and the light hydrocarbon distillate substantially free from water, is heated in the preheater 29 before introduction into the fractionating column. A somewhat reduced pressure is maintained on the fractionating column to actuate flow of the products volatilized in the primary stripper to the fractionating column. Pressure on the fractionating column is usually 65 to 140 lbs. pressure, preferably 100 lbs. per sq. in. The vapors from the fractionating column, consisting of light combustible hydrocarbons such as methane, ethane, propane and some isobutane, are conducted through line 30 and are ordinarily recompressed by compressor 32 to obtain a light condensate in the nature of propane to be used for cooling the top of the fractionating column. The temperature of the top of the column ranges between 20° F. to 120° F., preferably 40° F. The liquid at the bottom of the fractionating column is reheated in the boiler 37 to about 200° F. to 375° F. to insure the elimination of all constituents lighter than gasoline. The temperature at the bottom of the fractionating column is maintained from about 175° F. to 350° F., preferably 200° F. The unvaporized gasoline components from the reboiler are passed through the line 40 into the vapor space of the secondary stripper.

The secondary stripper may be maintained under considerably lower pressure than the primary stripper in order to facilitate the vaporization of the gasoline content of the absorbent oil. The heavy gasoline constituents of the partially denuded absorbent oil are vaporized with the aid of steam and passed up the secondary stripper where they are combined with the lighter gasoline fractions from the reboiler, and the mixture fractionated in the top of the stripper. Gasoline vapors are led from the top of the stripper through pipe 42, condensed in condenser 43, and a stable gasoline collected in the receiver 45. A part of this gasoline is preferably returned to the top of the stripper to aid in the fractionation of the vapors. A lean absorbent oil, substantially free from gasoline constituents, is drawn from the bottom of the secondary stripper and passed in heat exchange with the rich absorbent oil in the heat exchangers 9. The lean absorbent oil issuing from the heat exchangers has been reduced in temperature to about 100° F. to 250° F. This partially cooled oil is further cooled in a cooler 53 substantially below 100° F. to insure complete stripping of the gas in the absorber.

While a complete apparatus for carrying out the invention has been described, it is to be understood that the use of certain parts of the apparatus separately is within the scope of the invention. Furthermore, the invention is not to be limited by the specific parts of the apparatus described or in the details of the operation. Various modifications may be made and only such limitations are to be imposed as come within a fair and proper interpretation of the appended claims.

We claim:

1. The method of recovering gasoline from natural gas which comprises absorbing the gasoline and a substantial amount of other hydrocarbons lighter than gasoline in a liquid absorption medium to form a rich absorbent, subjecting said rich absorbent to successive distillation operations to remove in the first operation said other hydrocarbons and light ends of the gasoline and to remove in the second operation the heavy fractions of the gasoline, separately fractionating the vaporized products from the first distillation operation in the absence of absorbent oil, separating in the fractionation operation the light ends of the gasoline as a separate fraction free from hydrocarbons lighter than gasoline, and combining said separate fraction with the products undergoing distillation in said second distillation operation to vaporize and to mix with the heavy gasoline fractions vaporized therein, and fractionating the resultant mixture of light and heavy gasoline vapors to produce a stable gasoline.

2. The method of recovering gasoline from natural gas which comprises absorbing the gasoline and a substantial amount of other hydrocarbons lighter than gasoline in a liquid absorption medium to form a rich absorbent, subjecting said rich absorbent to successive distillation operations to remove in the first operation said other hydrocarbons and light ends of the gasoline and to remove in the second operation the heavy fractions of the gasoline, separately fractionating the vaporized products from the first distillation operation in the absence of absorbent oil, separating in the fractionation operation the light ends of the gasoline as a liquid fraction and the hydrocarbons lighter than gasoline as a vapor fraction, compressing the vapor fraction containing hydrocarbons lighter than gasoline to form a condensate, returning said condensate to the fractionating operation to act as a reflux medium and to cool the vapors undergoing fractionation, and combining said liquid fraction containing the light ends of gasoline separated in the fractionating operation with the products undergoing distillation in the second distillation operation to vaporize and to mix with the heavy gasoline fractions removed therein, and fractionating the resultant mixture of light and heavy gasoline vapors to form a stable gasoline.

3. The method of recovering gasoline from natural gas which comprises absorbing the gasoline and a substantial amount of other hydrocarbons lighter than gasoline in a liquid absorption medium to form a rich absorbent, subjecting said rich absorbent to successive distillation operations to remove in the first operation the other hydrocarbons and light ends of the gasoline and to remove in the second operation the heavy fractions of the gasoline, separately fractionating the vaporized products from the first distillation operation in the absence of absorbent oil, separating in the fractionation operation the light ends of the gasoline as an unvaporized liquid fraction partially free from said other hydrocarbons, reboiling said unvaporized liquid fraction separated in the fractionating operation to insure substantially complete separation of hydrocarbons lighter than gasoline from the unvaporized liquids after reboiling, and combining said unvaporized liquids after reboiling with the products undergoing distillation in said second distillation operation to vaporize and to mix with the heavy gasoline fractions removed therein, and fractionating the mixture of light and heavy gasoline vapors to produce a stable gasoline.

4. The process of recovering a stable gasoline from natural gas which comprises absorbing the gasoline and a substantial amount of other hydrocarbons lighter than gasoline in a liquid absorption medium, subjecting the resulting rich absorbent to a primary stripping operation to remove with the aid of steam the other hydrocarbons and a substantial amount of the light gasoline fractions, cooling the vapors removed in the primary stripping operation to partially condense the vapors, separating the steam from the resulting condensate, separately fractionating in the absence of absorbent oil the condensed and uncondensed products from the primary stripping operation after separation of the steam to separate said other hydrocarbons from the light gasoline fractions, subjecting the partially denuded absorbent from the first distillation operation to a second distillation operation to remove the heavier gasoline fractions and mixing the products vaporized in the second distillation operation, including said heavier fractions, with the lighter fractions after the separation of hydrocarbons lighter than gasoline therefrom and subjecting the resultant mixture to fractionation to produce a stable gasoline.

5. In an apparatus for recovering gasoline from natural gas, the combination of an absorber for contacting the gas with an absorbent liquid, a primary and secondary stripper for distilling the absorbed constituents from the absorbent, means for passing absorbent liquid from the absorber to the primary and then to the secondary stripper, a fractionating column, means for conducting products distilled in the primary stripper to the fractionating tower, means for conducting liquids condensed in said fractionating column to the secondary stripper and means including vapor lines and a condenser for recovering a gasoline from the secondary stripper.

6. In an apparatus for recovering gasoline from natural gas, the combination of an absorber for contacting the gas with an absorbent liquid, a primary and a secondary still, means for passing absorbent liquid from the absorber to the primary still and from the primary to the secondary still, a fractionator, means for conducting distilled products from the primary still to the fractionator, a compressor and condenser in vapor communication with said fractionator to partially condense vapors released therefrom, means for collecting and returning the resulting condensate to the fractionator as a reflux medium and connections for conducting liquids collecting in the fractionator to said secondary still.

7. In an apparatus for recovering gasoline from natural gas, an absorber for contacting the gas with an absorbent liquid, a primary and a secondary still, means for conducting rich absorbent from the absorber to the primary still and for passing partially denuded absorbent from the primary to the secondary still, a fractionating column, means for conducting the distillate from the primary still to the fractionating column, a reboiler having connections for receiving liquids from and for returning vapors to the fractionating column, and means for conducting the liquids from the reboiler to the secondary still.

8. In an apparatus for recovering gasoline from natural gas, an absorber for contacting the gas with an absorbent liquid, primary and secondary strippers, means for passing a rich absorbent from the absorber to the primary stripper and for passing partially stripped absorbent from the primary to the secondary stripper, means for introducing steam into the primary stripper, a condenser and separator in communication with the primary stripper for partially condensing the vapors evolved from the stripper and for separating water from the resulting condensate, a fractionating column, means for conducting condensate and uncondensed vapors from the separator to the fractionating column, and means for passing liquids from the fractionating column to the secondary stripper.

HOWARD S. COLE, Jr.
EDWIN R. COX.